Dec. 14, 1965    P. L. MICHAEL    3,223,194
SONIC VIBRATION LOCATOR AND INDICATOR
Filed Nov. 23, 1962    2 Sheets-Sheet 1

INVENTOR
PAUL LEE MICHAEL

BY
ATTORNEY

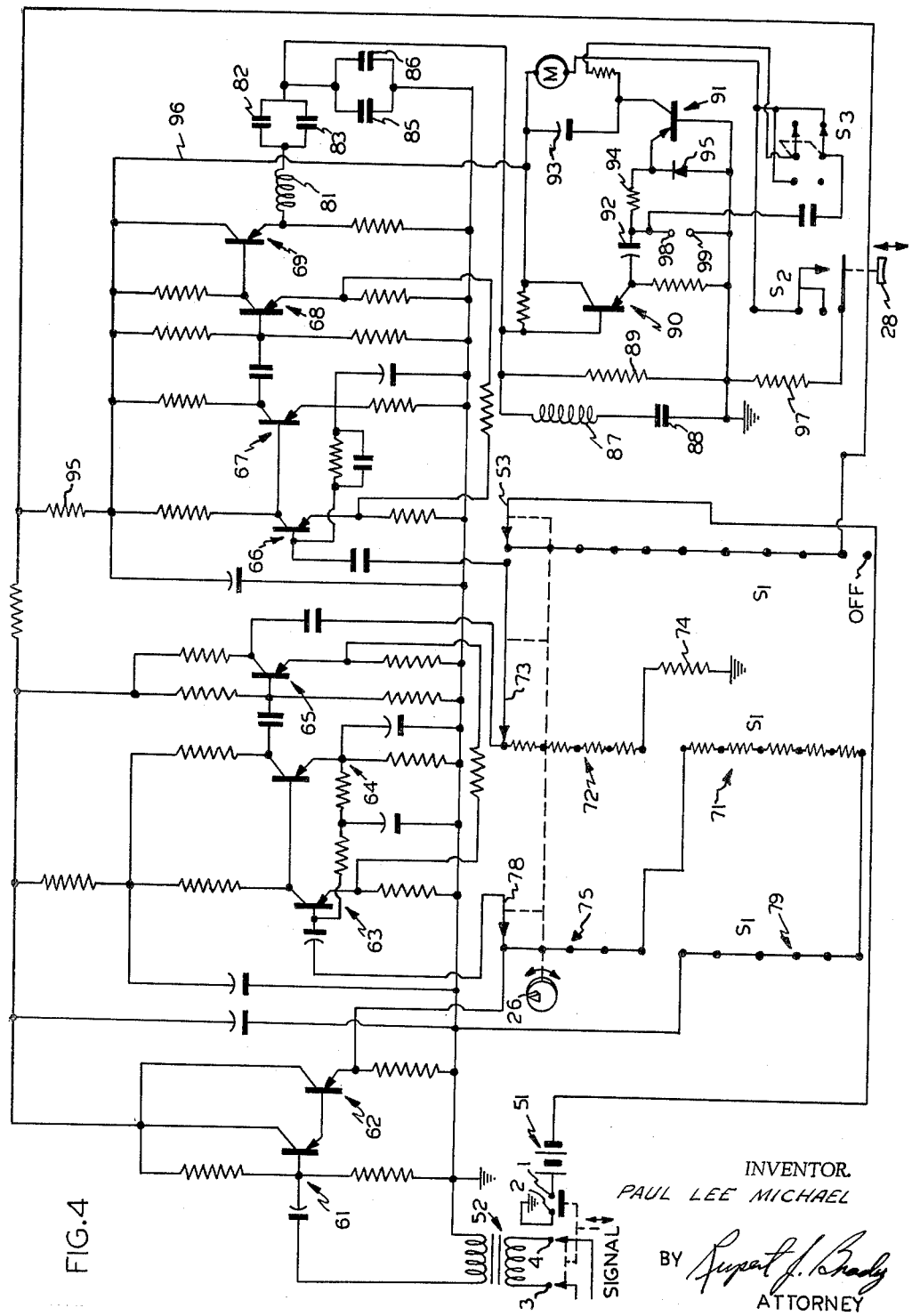

United States Patent Office 3,223,194
Patented Dec. 14, 1965

3,223,194
SONIC VIBRATION LOCATOR AND INDICATOR
Paul L. Michael, 667 Franklin St., State College, Pa.
Filed Nov. 23, 1962, Ser. No. 239,575
2 Claims. (Cl. 181—.5)

The present invention relates to instruments for locating and for indicating the intensity of sonic vibrations, and more particularly to extremely sensitive apparatus for pinpointing the leak of a fluid from a pipe.

It is known that the leak of a fluid from a pipe buried in the ground, for example, or located beneath a body of water, causes sonic vibrations in the ground or water. It has been proposed that the location of such a leak can be determined by means for picking up the sonic vibrations, means for converting the vibrations to electrical waves and means for amplifying and indicating the magnitude of the electric waves to determine the intensity of the vibrations. By comparing the intensities of sonic vibrations at different locations, the position of a leak can be pinpointed from the surface of the earth without excavation, or from the surface of the body of water.

It is an object of the present invention to provide an improved instrument for locating sonic vibrations and for indicating the intensity of the vibrations.

A further object is to provide a highly sensitive and reliable instrument for locating a leak of a fluid from a confined area contained within a sonic wave transmission medium.

A further object is to provide an instrument that is easy to use, has its own power supply, is compact and light in weight, and is self-contained in its own carrying case.

Another object is to provide a very sensitive instrument for picking up sonic vibrations and for indicating the intensity of the vibrations.

Still another object is to provide an instrument which is composed of a sonic vibration transducer and an electrical wave amplifier and meter for indicating the intensity of sonic vibrations, the instrument being capable of being used with a relatively long connecting cable between the transducer and the amplifier input.

Still another object is to provide an instrument, as described above, which cannot dissipate battery current when not being used, even though the battery switch is not in its "off" position.

Yet another object is to provide in a sonic vibration transducer for picking up earth vibrations, a special base for more efficiently transmitting vibrations to the transducer from the earth.

Still another object is to provide a base, as described above, which can be adapted for efficiently transmitting vibrations either from hard top or soft top earth.

A further object is to provide an improved variable gain circuit for amplifying vibrations in the sonic wave frequency range.

In accordance with the present invention, the foregoing objects are achieved by an instrument that is composed of: a base for supporting a transducer, the base having a special shape and a special distribution of holes therein for receiving prongs which enable the base to transmit vibrations more efficiently either from hard top or soft earth; a battery-powered transistor amplifier which has an input transformer that is mounted in the instrument case and has four input terminals rather than the conventional two terminals for completing the ground circuit of the battery only when the transducer is connected to the amplifier for supplying an input signal to the amplifier; a band pass filter for frequencies between 200 and 2000 cycles per second for use with the amplifier and the vibration transducer having the special base for increasing the sensitivity of the instrument; and a meter for indicating the intensity of sonic vibrations. The amplifier is composed of two stages and an attenuator for adjusting the sensitivity of the instrument, and switching means are employed for utilizing either one or both amplifier stages in the instrument. When the instrument is utilized for locating leaks in pipes submerged in or covered by water, or for locating fluid leaks in large tanks or reservoirs, a hydrophone may be attached directly to the instrument in lieu of the transducer and special supporting base and the instrument can be operated in a boat on the surface of the water by towing the hydrophone over the submerged pipe.

The actual achievement of the foregoing objects as well as other objects and advantages of the invention will become more apparent from the following description of the accompanying drawings wherein:

FIG. 4 is a schematic circuit diagram of the transistor amplifier, attenuator, filter, and meter for indicating sonic vibrations.

Figure 1:
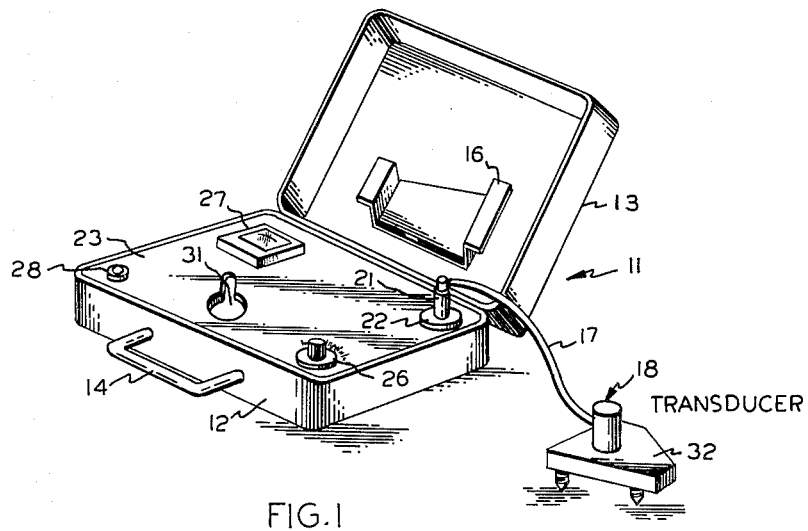
FIG. 1 is a perspective view of the sonic vibration locating and indicating instrument and its carrying case, and shows the special base for the transducer mount in accordance with the invention.

Referring to FIG. 1, the instrument is housed in a carrying case 11 that is composed of a lower compartment 12 having a hinged lid 13 for opening and closing compartment 12, and a handle 14 for carrying the case when the lid is shut. Attached to the inside of the lid 13 an element 16 is provided for carrying a transducer cable 17 to store the cable when the instrument is not being used.

The cable 17 is an electrical cable which has a low impedance that is matched to the output of a low impedance transducer 18 connected to one end of the cable. The other end of the cable 17 is provided with a plug attachment 21 for insertion into receptacle 22 in the upper right hand corner of the panel 23. The plug connects cable 17 to the input of an amplifier, not shown, which is housed in the compartment 12 beneath the panel 23.

At the lower right hand corner of the panel 23, a control knob 26 is provided for adjusting the sensitivity of the instrument and for turning "off" the power supply connection to the amplifier. In the upper left hand corner of panel 23, a meter dial 27 is provided for indicating the intensity of sonic vibrations and for indicating whether or not the power supply battery for the amplifier is good. This battery, not shown, is housed in the compartment 12 of the carrying case. A push button 28 at the lower left hand corner of the panel is used to check the battery contained within the carrying case 11.

An opening 31 is provided in panel 23 for receiving and for storing the transducer 18 in the carrying case 11 below the panel 23 when the instrument is not being used. Attached to the bottom of the transducer 18, a base 32 is provided for transmitting vibrations efficiently from a sonic wave transmission medium, such as the ground, to transducer 18. The base 32 can be stored in the carrying case 11 above the panel 23 when the transducer 18 is inserted into the opening 31 for storage. Thus, the complete instrument is housed in case 11 and is readily carried from one location to another.

In accordance with one feature of the invention, the transducer base 32 is especially adapted for efficiently transmitting sonic vibrations to the transducer 18 either from hard top or from soft top earth. This is achieved because of the special shape of base 32 and because of a special distribution of holes 33, 34 and 35 in the base for threadably receiving vibration transmitting prongs 38, 39 and 40, respectively. Another hole 41 is provided in the base 32 for threadably receiving a long prong, not shown. This hole 41 and the long prong is used together with the other holes and additional long prongs, not shown, for replacing the short prongs 38–40 if the instrument is used for detecting vibrations in soft top earth.

Figure 2:
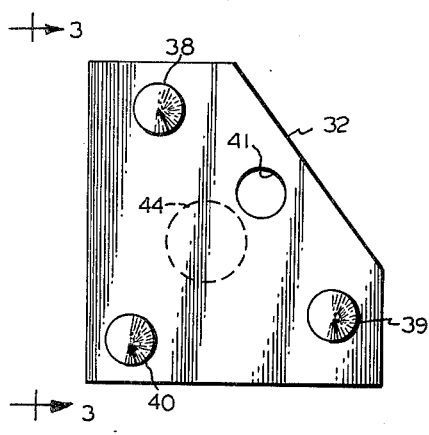
FIG. 2 is a top view of the base for the transducer mount.
Figure 3:
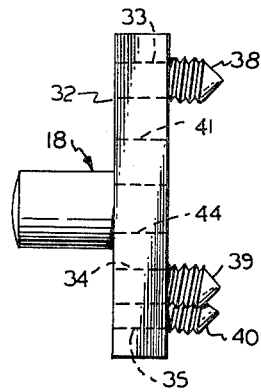
FIG. 3 is a side view of the base as viewed from the line 3—3 in FIG. 2.

The base 32 is a five-sided polygon which has a special shape and a special distribution of prong receiving holes like that shown in FIG. 2. The hole 44 approximately in the middle of base 32 receives and supports the mount of the transducer 18.

It will be noted that the prong receiving holes are in a pattern that is non-circular. It has been found that with the particular hole pattern and a base having a shape as illustrated in FIG. 2, sonic vibrations in the ground within a frequency range from 200 to 2000 cycles per second are transmitted to the transducer with maximum efficiency. In one instrument that has been constructed, each of the two longer sides of the base has a length of four inches and each of the two shorter sides has a length of one and three-fourths inches. The base is three-fourths of an inch thick.

In FIG. 4, an electrical schematic diagram of the instrument components contained within the compartment 12 is illustrated. Basically, these components consist of an impedance matching circuit, an amplifier, an attenuator for varying the overall amplifier gain, a filter, and a meter. A three deck rotary switch $S_1$ is used for varying the setting of the attenuator and for supplying power to the amplifier. Power is obtained from a battery 51 housed within the compartment 12.

The input to the amplifier is by a transformer 52, which is used to produce a voltage gain and to match a relatively high input impedance of the amplifier to the relatively low output impedance of the transducer 18. The output impedance of the transducer is about 250 ohms and the input impedance of the amplifier is about 100 kilohms, for example. Since the transducer has a low impedance and the transformer is mounted in the instrument case, it is possible to use relatively long connecting cables if necessary.

When the plug attachment 21 at the end of the transducer cable 17 is inserted into the receptacle 22, shown in FIG. 1, the signal from the transducer 18 is applied to pins 3 and 4 of the input connector for the transformer 52. In accordance with a feature of the invention, the input connector used to the transformer has another pair of pins 1 and 2. Pin 1 is connected to the positive side of battery 51. Pin 2 is connected to ground. The ground circuit for the battery 51 is completed only when the plug attachment 21 is inserted into the receptacle 22 for supplying a transducer signal to terminals 3 and 4. This provides an automatic shut-off and saves the battery 51 in case the operator forgets to turn the battery switch 53 to its "off" position.

The output from transformer 52 is supplied to the input of a pair of transistor circuits referred to generally by 61 and 62. The transistor circuit 61 has a relatively high input impedance of approximately 100 kilohms, for example. The transistor circuit 62 has an emitter follower for providing a low impedance output for the front of the attenuator.

The attenuator is composed of a first resistance voltage divider 71 and a second voltage divider 72. As is shown schematically in FIG. 4, five terminals are located along the divider 72 and six terminals are located along the divider 71 for contact with a movable selector switch 73.

The values of the resistances between the voltage divider terminals are chosen in accordance with circuit design requirements. One end terminal of the voltage divider 72 is connected to the output of the first amplifier stage, the other end terminal being connected to ground by a resistor 74. One end terminal of the voltage divider 71 is connected to the emitter of the transistor circuit 62 by a connection 75 that has five directly connected terminals as illustrated. The other end terminal of divider 71 is connected to ground by a connection 79 that has six directly connected terminals.

The positions of the five terminals along connection 75 correspond with the positions of the five corresponding terminals along the voltage divider 72. The positions of the six terminals along the connection 79 correspond with the positions of the six corresponding terminals along the voltage divider 71. The terminals along the connections 75 and 79 are adapted to be contacted by a movable selector switch 78, which is ganged with the elector switch 73. The selector switch 78 connects the emitter follower output of the transistor circuit 62 to the input of a first transistor amplifier stage composed of transistor circuits 63, 64 and 65. This connection is made and voltage gain is added to the instrument by the first amplifier stage if the selector switch 78 contacts any of the five terminals along the connection 75. At the moment the selector switch 78 contacts any of the six terminals along connection 79, the input to the amplifier circuit 63 is grounded to take away the gain in the instrument which otherwise is produced by the first amplifier.

If the selector switch 78 contacts any of the five terminals along connection 75, the selector switch 73 contacts a corresponding one of the five terminals along voltage divider 72 to supply a signal of adjustable amplitude to the input of a second amplifier stage from the first amplifier stage. If instead the selector switch 73 contacts any one of five of the six terminals along voltage divider 71, a signal of adjustable amplitude is supplied to the input of the second amplifier stage from the voltage divider 71, the first amplifier stage being out of the circuit.

The second amplifier stage is composed of transistor circuits 66, 67 and 68. This amplifier stage is used at all times. A transistor circuit 69 serves as an emitter follower to match the output impedance of the second amplifier stage to the impedance of the filter network.

The filter network is composed of an inductor 81 in series with parallel connected capacitors 82 and 83, a shunt network of parallel connected capacitors 85 and 86, another shunt network of an inductor 87 in series with a capacitor 88, and a shunt resistor 89. The circuit values of the elements of the filter network are chosen for passing signals over a band of frequencies from 200 to 2000 cycles per second and for blocking other frequencies. In one particular design of the filter, the elements have the following circuit values:

| | | |
|---|---|---|
| Inductor 81 | henry | 1 |
| Capacitor 82 | microfarads | 0.047 |
| Capacitor 83 | pico farads | 4700 |
| Capacitor 85 | do | 5600 |
| Capacitor 86 | do | 820 |
| Inductor 87 | henries | 8 |
| Capacitor 88 | microfarad | 0.22 |
| Resistor 89 | kilohms | 22 |

The output impedance of the filter is matched with a slow-fast meter circuit by a transistor circuit 90. The slow-meter response circuit is composed of capacitors 92 and 93, the resistor 94, a diode 95 and a transistor 91. A switch $S_3$ enables the operator to choose slow or fast response. A switch $S_2$, which is operated by panel push button 28 and is a push to make switch, is used for completing a D.C. circuit from the negative terminal of battery 51 to ground through a load resistor 95, connection 96, meter M, the switch $S_2$, and a resistor 97. The resistor 97 has a large relative value of resistance.

In one actual embodiment of the instrument shown in FIG. 4, all of the transistors are type 2N321, except transistor 91. Transistor 91 is a type 2N1131 or 2N328A. The diode 95 is type 1N70. The values of the components used with the various transistor circuits and the connections of the circuit components used therewith are determined by standard design techniques, and are unnecessary to describe.

The dial 27 on the panel 23, FIG. 1, is the indicating dial for the meter M for visually indicating the intensity of sonic vibrations. If desired, an earphone can be connected to terminals 98 and 99 for audibly indicating sonic vibrations detected by the instrument.

The switch $S_1$ is a three deck rotary switch that is used with the attenuator and the selector switch 53. Switch 53 also is the power switch for connecting the negative terminal of the battery 51 to the collectors of the various transistor circuits. The power switch and the voltage dividers 71 and 72 are arranged to prevent accidental overloading when battery power is first applied. In other words, when power is applied first, the attenuator is at its maximum and the instrument has minimum sensitivity.

Another feature of the instrument is that it can be used to locate leaks in pipes covered with water, fluid leaks from large tanks or reservoirs. This is accomplished by a hydrophone attachment so that the instrument can be operated in a boat by towing the hydrophone over the submerged pipe, or adjacent the sides of a tank of fluid or over the bottom of a tank or fluid reservoir. The hydrophone is designated to have substantially the same response as the arrangement of transducer and supporting base as set forth in the preferred embodiment of the invention.

The instrument is operated in the following manner. First, the plug attachment 21 is inserted into receptacle 22 for connecting the positive side of the battery 51 to ground. The battery 51 is tested by adjusting the sensitivity knob 26 to turn the instrument "on" and insert maximum attenuation into the amplifier. The button 28 is pushed to complete the D.C. circuit of battery 51 through meter M. The battery is operative if the indicator of the meter M attains a predetermined reading.

The transducer 18 is placed on the ground and supported by the prongs carried by its base above a water pipe buried in the ground for example. The sensitivity knob 26 is adjusted until the meter M reads on scale.

The instrument picks up sonic vibrations in the ground caused by water or other fluid leaking from the buried pipe. The transducer 18 is moved along the surface of the ground at four foot intervals, and the reading on the dial of the indicator is observed. A high reading indicates close proximity to a leak. For more precise location of the leak the transducer is moved small distances to either side of the point where the high reading occurred. The highest reading determined from the sum of the indications of dial 26 and meter 27 pinpoints the location of a water leak from the buried pipe.

Although the instrument can be used for locating leaks in buried water pipes or pipes covered with water, as has been described above, other applications are possible. For example, it might be used in air, that is, to locate losses in steam pipes, etc., by using a directional microphone pickup. Another application might for pinpointing leaks in a container of fluid, such as a water reservoir, or fluid tank.

Obviously changes can be made in the above described embodiment of the invention and different words of description might be used without departing from the scope and spirit of the invention. Therefore, it is understood that the invention is limited solely by the scope of the accompanying claims.

What is claimed is:

1. An instrument for indicating the intensity of sonic vibrations comprising, first and second amplifier stages, an input circuit having an input and an output, transducer means for supplying a signal representative of a sonic vibration frequency to the input of said input circuit, a first voltage divider connected to the output of said input circuit and a second voltage divider connected to the output of said first amplifier stage, a ground circuit, first switching means connected to the input of said first amplifier stage movable between said ground circuit and the output of said input circuit, and second switching means movable with said first switching means connected to the input of said second amplifier stage movable between said first and second voltage dividers, said second switching means connecting only said second amplifier stage with the output of said input circuit when said first switching means is connected to said ground circuit, and said first and second amplifying stages connected in series with the output of said input circuit by said first and second switching means when said second switching means is connected to the second voltage divider, a meter for rendering an indication of the signal representative of the sonic vibration, and a bandpass filter for passing signals within a predetermined range of sonic vibration frequencies connecting said meter to the output of said second amplifier stage.

2. An instrument for use on the surface of the ground for indicating the intensity of sonic vibrations caused by fluid leaking from a pipe beneath the surface comprising, a transducer adapted for coupling to the ground for receiving sonic vibrations therefrom caused by fluid leaking from a pipe and adapted to convert the same into an electrical output signal, first amplifier means, a first attenuator circuit, an input circuit connected to said transducer and having an output circuit, said first attenuator circuit connected to the output circuit of said input circuit, a ground circuit, first switch means movable between said ground circuit and the output circuit of said input circuit connected to the input of said first amplifier means, second amplifier means, a second attenuator circuit connected to the output of said first amplifier means, second switch means connected to the input of said second amplifier means and selectively movable between said first and second attenuator circuits, a meter for indicating the intensity of sonic vibrations received by said transducer, a bandpass filter connected between the output of said second amplifier means and said meter, and said first switch means connected for movement with said second switch means, whereby when said first switch means connects the input of said first amplifier means to said ground circuit, said second switch means connects said first attenuator circuit to the input of said second amplifier means, thus bypassing said first amplifier means and connecting the transducer output signal to the input of the second amplifier means, and when said first switch means connects the input of said first amplifier means to the output circuit of said input circuit, said second switch means connects the output of said first amplifier means to the input of said second amplifier means through said second attenuator circuit to impart greater gain to the transducer output signal.

References Cited by the Examiner

UNITED STATES PATENTS

| 267,825 | 11/1892 | Bell | 181—.5 |
| 1,774,379 | 8/1930 | Jones | 340—17 |
| 1,995,305 | 3/1935 | Hayes | 340—17 |
| 2,340,714 | 2/1944 | Traver et al. | 181—.5 |
| 2,671,134 | 3/1954 | Chrystie | 181—.5 |
| 3,028,450 | 4/1962 | Manning | 181—.5 |

FOREIGN PATENTS

| 456,616 | 4/1936 | Great Britain. |

SAMUEL FEINBERG, *Primary Examiner.*

CHESTER L. JUSTUS, *Examiner.*